United States Patent [19]
Hagar

[11] 3,790,131
[45] Feb. 5, 1974

[54] BUTTERFLY VALVE
[75] Inventor: Donald K. Hagar, Macungie, Pa.
[73] Assignee: Masser Industries Incorporated, Allentown, Pa.
[22] Filed: Sept. 1, 1972
[21] Appl. No.: 285,931

[52] U.S. Cl. ............................................. 251/306
[51] Int. Cl. .......................................... F16k 1/226
[58] Field of Search .... 277/187, 188, 190; 251/160, 251/170, 171, 173, 192, 298, 305–308

[56] References Cited
UNITED STATES PATENTS

| | | | |
|---|---|---|---|
| 2,843,353 | 7/1958 | Marden | 251/306 X |
| 2,936,153 | 5/1960 | Gaffin | 251/306 |
| 2,983,478 | 5/1961 | Masheder | 251/307 X |
| 2,988,320 | 6/1961 | Kent | 251/306 X |
| 3,027,133 | 3/1962 | Anderson | 251/173 |
| 3,144,040 | 8/1964 | White | 251/171 X |
| 3,314,642 | 4/1967 | Kautz et al | 251/307 |
| 3,578,287 | 5/1971 | Salerno | 251/306 |
| 3,630,485 | 12/1971 | Williams | 251/307 |
| 3,325,142 | 6/1967 | Thompson | 251/306 |

FOREIGN PATENTS OR APPLICATIONS

| | | | |
|---|---|---|---|
| 948,379 | 8/1956 | Germany | 251/306 |

Primary Examiner—Henry T. Klinsiek
Attorney, Agent, or Firm—Morton, Bernard, Brown, Roberts & Sutherland

[57] ABSTRACT

A butterfly valve comprising a valve casing, an annular seat within the casing, a rotatable shaft journaled in the casing, and a valve disc carried by the shaft for opening and closing the valve cooperatively with said seat, is improved by the seat being the inner face of a four-faced, closed sealing ring of trapezoidal cross-section positioned within an annular groove in the inner wall of the casing, a four-faced, closed retaining ring of trapezoidal cross-section being wedged in the annular groove beside the sealing ring, the sealing and retaining rings being so oriented in the groove that the parallel sides of their trapezoidal cross-sections are parallel to the axis of the casing, with the long parallel side of the retaining ring's trapezoidal cross-section being closer to the axis than the short parallel side of the retaining ring's trapezoidal cross-section, and the short parallel side of the sealing ring's trapezoidal cross section being closer to the axis than is the long parallel side of the sealing ring's trapezoidal cross-section.

10 Claims, 6 Drawing Figures

PATENTED FEB 5 1974

PATENTED FEB 5 1974 3,790,131

BUTTERFLY VALVE

This invention relates to an improved seating arrangement for a butterfly valve. Most preferably the new seating arrangement is used in a butterfly valve wherein the valve disc is either offset from the shaft or is in a canted or skewed position relative to the shaft.

This invention is concerned with a butterfly valve that comprises a valve casing, an annular seat within the casing, a rotatable shaft journaled in the casing, and a valve disc carried by the shaft for opening and closing the valve cooperatively with the seat. A common seat in such a valve is the inner face of a closed ring of resilient material, preferably rubber, that is positioned within an annular groove in the inner wall of the valve casing. In one embodiment of this type of seal, rigid, arcuate retaining strips, for example made of steel, are also positioned in the annular groove, beside the sealing ring, in such a manner that each strip can, by the adjustment of bolts, be moved toward the sealing ring to laterally compress the sealing ring between the retaining strip and one side wall of the groove, thus holding the sealing ring in place and causing the inner face of the sealing ring in the region of that retaining strip to be urged out of the annular groove and toward the axis of the casing. Thus, the tightening of the bolts serves to decrease the inner diameter of the sealing ring, and the more the retaining strip bolts are tightened, the tighter will be the seal against the periphery of the valve disc. This seating arrangement has several drawbacks, however. For one, the amount of machining required to get all of the female threads into the valve casing for receiving the retaining strip adjustment bolts is considerable, especially where valves several feet in diameter are involved. Also, in this type of valve seat the annular groove must be considerably wider than the combined widths of the sealing ring and the retaining strip in order to allow for axial separation of the strip from the sealing ring so that the sealing ring can be removed from the groove and replaced when it is worn out. The wider the annular groove, the more machining is involved in cutting it into the inner wall of the valve casing. These machining requirements add considerably to the cost of manufacturing such valves.

A further drawback of the type of valve seat described above is that the retaining strip bolts can be loosened by vibration or shock during operation of the valve. In addition, rusting and fusing of the bolts, especially where the valve is used in a water conduit, can make subsequent adjustments extremely difficult.

The present invention provides an improved seating arrangement for butterfly valves which reduces or eliminates the above-described problems. The improvement resides in the use of a closed retaining ring of a particular configuration in conjunction with a closed sealing ring that also has a special configuration. Both rings are four-faced and have trapezoidal cross-sections, and together the rings substantially fill the width of the annular groove. The inner diameter of the retaining ring is larger than that of the sealing ring, and the rings are so oriented in the annular groove that the parallel sides of their trapezoidal cross-sections are parallel to the axis of the annular groove in the valve casing. The long parallel side of the retaining ring's trapezoidal cross-section is closer to the axis of the annular groove in the casing than the short parallel side of that cross-section. The trapezoidal cross-section of the sealing ring, however, is arranged in just the opposite manner, the short parallel side of the sealing ring's trapezoidal cross-section being closer to the axis of the annular groove in the casing than the long parallel side. Thus, the short parallel side of the sealing ring's trapezoidal cross-section is formed from the inner face of that ring, the face which constitutes the valve seat.

In the valve of the present invention the retaining ring is wedged in the annular groove in such a manner that it exerts a force away from the axis of the casing, thereby holding the sealing ring securely in the annular groove. The retaining ring preferably has means for opening and closing it, such as a pivotable or removable segment of the ring, so that the retaining ring can be removed from the annular groove, for instance so as to replace a worn out sealing ring, and then returned to the groove.

The improved seating arrangement of the present invention provides several advantages. For one, relatively little machining is required since the annular groove can be made narrower than in the prior art arrangement described above and since the use of bolts can be kept to a minimum, for example just one to lock the retaining ring in its closed, wedged-in position. Fewer bolts also means fewer adjustments to be affected by shocks or vibrations, as well as greater ease in removing the retaining and sealing rings for servicing. Effecting a tighter seal against the periphery of the valve disc is a simple matter, requiring only that the retaining ring be removed from the annular groove and one or more shims be placed underneath the sealing ring.

Another advantage of the present invention resides in the fact that the shimming method of moving the seating face of the sealing ring closer to the valve disc, for a tighter seal, does not stretch the surface of the seating face, as does that arrangement wherein the ring is axially compressed so as to cause its seating face to bulge out toward the valve disc. The stretched seating surface of a rubber sealing ring deteriorates much more quickly than if the surface is not under such tension. Thus in the valve of the present invention rubber sealing rings are observed to last longer.

The invention will be better understood by considering the accompanying drawings, which are presented for the purpose of illustrating one manner of practicing the present invention.

Referring now to the drawings.

Figure 1:
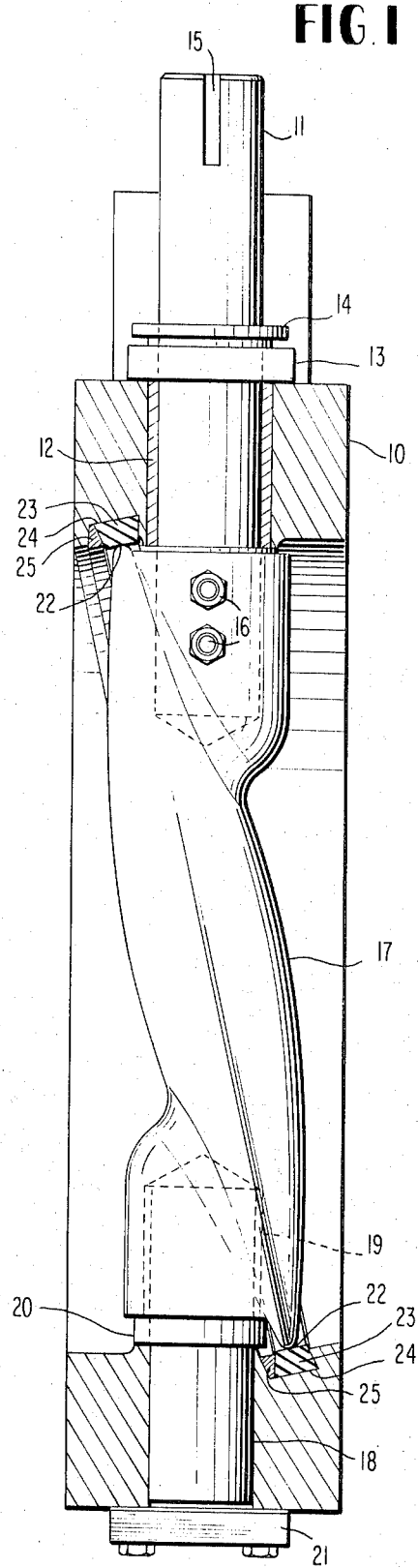
FIG. 1 is a side view, partially in cross-section, of a butterfly valve embodying the improved seating arrangement of the present invention.
Figure 2:
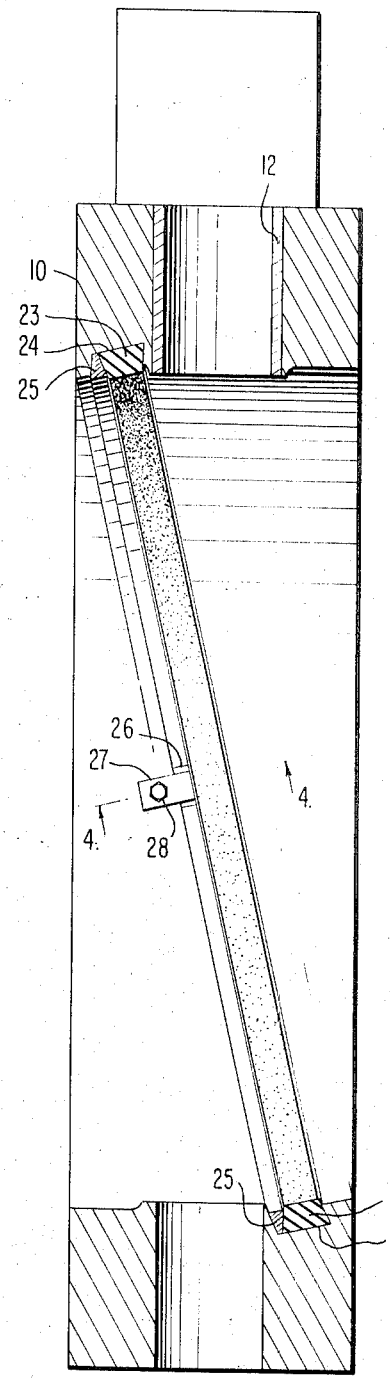
FIG. 2 is a side cross-section of the valve casing with seat.
Figure 3:
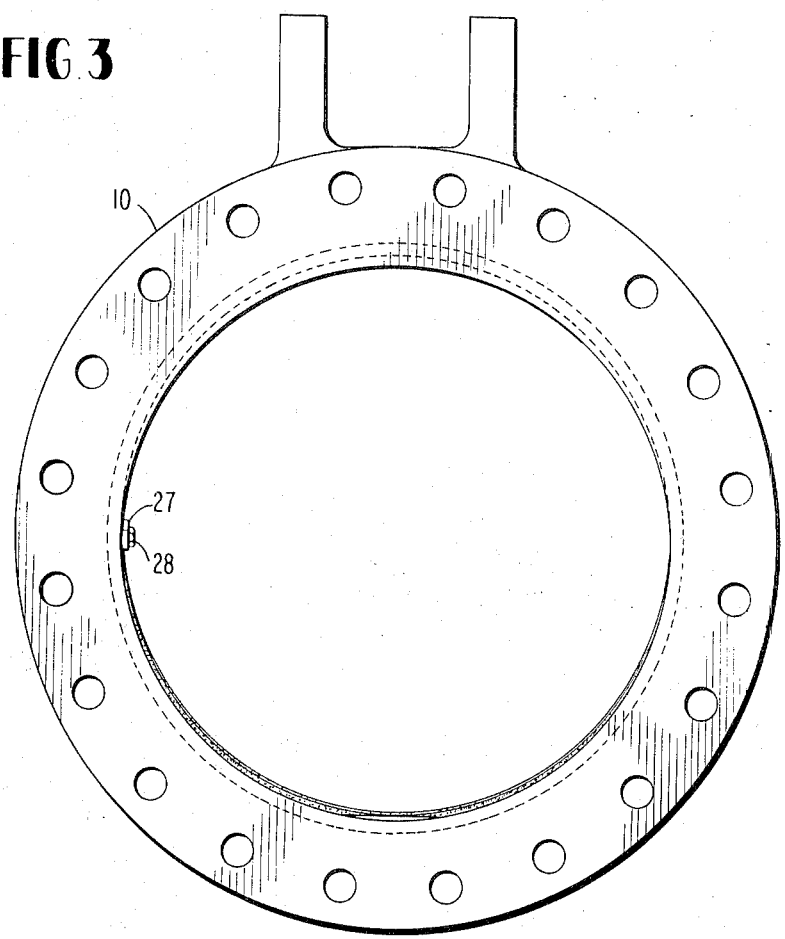
FIG. 3 is a reduced front view of the valve casing with seat.
Figure 6:
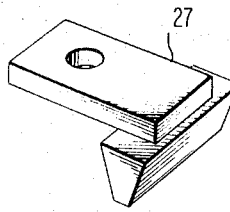
FIG. 6 is an enlarged view of the keystone segment of the valve's retaining ring.
Figure 4:
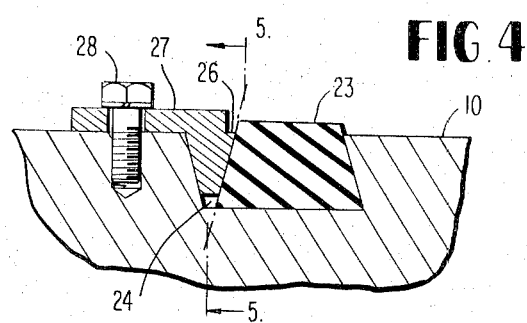
FIG. 4 is an enlarged, segmented section on line 4—4 of FIG. 2.
Figure 5:
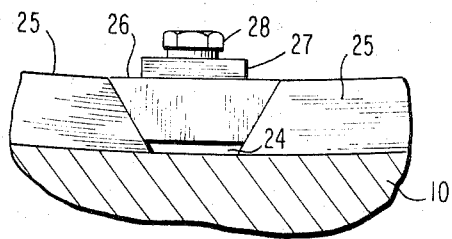
FIG. 5 is a segmented section on line 5—5 of FIG. 4.

As depicted in FIG. 1 of the drawings, valve casing 10 has perpendicularly journaled in it a top shaft 11, which passes through top bearing 12, top packing cover 13, and follower 14. A key slot 15 is found in the end of shaft 11 for turning the shaft. The lower end of shaft 11 is connected via dowel pins and nuts 16 to valve disc 17, which is shown in the figure in its closed position. Valve disc 17 is skewed or canted with respect both to the valve casing 10 and the shaft 11. The bottom of valve disc 17 fits over bottom shaft 18 and bottom bearing 19. Bottom shaft 18 extends through bottom thrust bearing 20 and casing 10 and is held in place by bottom cover plate 21.

The periphery 22 of valve disc 17 is seated on the inner face of rubber sealing ring 23, the cross-section of which is a regular trapezoid. Sealing ring 23 is mounted in annulus 24 in the inner wall of casing 10. The cross-section of annulus 24 is a parallelogram or trapezoid. Also wedged in annulus 24, beside sealing ring 23, is a steel retaining ring 25, the cross-section of which is likewise a regular trapezoid. The inner diameter of retaining ring 25 is larger than that of sealing ring 23 so that valve disc 17 will clear the retaining ring when it is turned.

Retaining ring 25 has a removable keystone or wedge segment 26 which is held in place by arm 27 and bolt 28, which is threaded into the inner wall of casing 10. Keystone segment 26 holds retaining ring 25 tightly in annulus 24, and retaining ring 25 in turn holds sealing ring 23 tightly in annulus 24. To remove the retaining ring and thereby gain access to sealing ring 23 it is only necessary to remove bolt 28, whereupon keystone section 26 will pop out.

As mentioned hereinabove, shimming means can be positioned between the outer face of sealing ring 23 and the bottom wall of annulus 24 if it is desired to shorten the inner diameter of sealing ring 23. This is easily accomplished in the valve depicted in the drawings because of the ability to get underneath the sealing ring merely by removing bolt 28.

It is claimed:

1. In a butterfly valve comprising a valve casing, an annular seat within the casing, a rotatable shaft journaled in the casing, and a valve disc carried by the shaft for opening and closing the valve cooperatively with said seat, the plane of the periphery of the valve disc being different from the planes of the shaft, the improvement wherein the seat is the inner face of a four-faced, closed sealing ring of trapezoidal cross-section, said sealing ring being made of resilient material and positioned within an annular groove in the inner wall of the casing so as to be in sealing engagement with the periphery of the valve disc when the valve is in the closed position, a four-faced, closed retaining ring of trapezoidal cross-section and having a larger inner diameter than that of the sealing ring being wedged in said annular groove beside the sealing ring, and said sealing ring and retaining ring together substantially filling the width of said groove, the sealing and retaining rings being so oriented in the groove that the parallel sides of their trapezoidal cross-sections are parallel to the axis of the annular groove in the casing, with the long parallel side of the retaining ring's trapezoidal cross-section being closer to said axis than the short parallel side of the retaining ring's trapezoidal cross-section, and the short parallel side of the sealing ring's trapezoidal cross-section being closer to said axis than the long parallel side of the sealing ring's trapezoidal cross-section.

2. The improvement of claim 1 wherein the valve disc is in a skewed position relative to the casing, and the shaft is perpendicular to the axis of the casing.

3. The improvement of claim 1 wherein the retaining ring contains a pivotable or removal segment for opening and closing it so the retaining ring can be removed from and returned to the annular groove.

4. The improvement of claim 3 wherein the pivotable or removable segment of the ring has the configuration of a keystone.

5. The improvement of claim 1 wherein the cross-section of the sealing ring is a regular trapezoid.

6. The improvement of claim 1 wherein the sealing ring is made of rubber.

7. The improvement of claim 1 wherein the cross-section of the annular groove is a trapezoid.

8. In a butterfly valve comprising a valve casing, an annular seat within the casing, a rotatable shaft journaled in the casing perpendicular to the axis of the casing, and a valve disc carried by the shaft in a skewed position relative to the shaft and the casing for opening and closing the valve cooperatively with said seat, the improvement wherein the seat is the inner face of a four-faced, closed, rubber sealing ring of trapezoidal cross-section, said sealing ring being positioned within an annular groove in the inner wall of the casing so as to be in sealing engagement with the periphery of the valve disc when the valve is in the closed position, a four-faced, closed retaining ring of trapezoidal cross-section and having a larger inner diameter than that of the sealing ring being wedged in said annular groove beside the sealing ring, and said sealing ring and retaining ring together substantially filling the width of said groove, the sealing and retaining rings being so oriented in the groove that the parallel sides of their trapezoidal cross-sections are parallel to the axis of the annular groove in the casing, with the long parallel side of the retaining ring's trapezoidal cross-section being closer to said axis than the short parallel side of the retaining ring's trapezoidal cross-section, and the short parallel side of the sealing ring's trapezoidal cross-section being closer to said axis than the long parallel side of the sealing ring's trapezoidal cross-section, said retaining ring containing a keystone segment that is removably fixed in the annular groove.

9. The improvement of claim 8 wherein the cross-section of the sealing ring is a regular trapezoid.

10. The improvement of claim 9 wherein the cross-section of the annular groove is a trapezoid.

* * * * *